(12) United States Patent
Geschke et al.

(10) Patent No.: US 6,192,315 B1
(45) Date of Patent: Feb. 20, 2001

(54) DUAL-CALIBRATED COMPASS

(75) Inventors: James R. Geschke; Thomas R. Olson; Mark Michmerhuizen, all of Holland; Gregory B. Colon, Grand Rapids, all of MI (US)

(73) Assignee: Prince Corporation, Holland, MI (US)

( * ) Notice: Under 35 U.S.C. 154(b), the term of this patent shall be extended for 0 days.

(21) Appl. No.: 08/884,454

(22) Filed: Jun. 27, 1997

(51) Int. Cl.[7] ............... G05D 1/00; G01C 25/00; G01C 17/00
(52) U.S. Cl. .............. 701/224; 701/200; 701/207; 702/85; 702/92; 702/93; 93/1.76
(58) Field of Search ................ 701/224, 211, 701/220, 207, 200; 702/85, 92, 93, 150; 73/1.75, 1.76; 33/324, 355 R, 356

(56) References Cited

U.S. PATENT DOCUMENTS

| | | | |
|---|---|---|---|
| 4,807,462 | 2/1989 | Al-Attar | 73/1.76 |
| 4,953,305 | 9/1990 | Van Lente et al. | 33/356 |
| 5,390,122 | 2/1995 | Michaels et al. | 701/28 |
| 5,406,492 | * 4/1995 | Suzuki | 364/449 |
| 5,644,851 | * 7/1997 | Blank et al. | 33/361 |

\* cited by examiner

Primary Examiner—William A. Cuchlinski, Jr.
Assistant Examiner—Arthur D. Donnolly
(74) Attorney, Agent, or Firm—Foley & Lardner (57) ABSTRACT

An electronic compass system of the present invention includes a sensor for detecting the earth's magnetic field and for providing electrical signals representing the direction of the vehicle, a heading indicator for indicating vehicle headings in response to received vehicle heading signals, and a processor coupled to the sensor for receiving the electrical signals and coupled to the heading indicator for supplying the vehicle heading signals to the heading indicator. The processor preferably includes a first compass controller for calculating vehicle headings in response to the received electrical signals using precalibration data to compensate for expected vehicular magnetism, a second compass controller for calculating vehicle headings in response to the received electrical signals using an automatic calibration routine to compensate for actual vehicular magnetism, and a control transferring mechanism for initially selecting the vehicle headings calculated by the first compass controller to be represented by the vehicle heading signal supplied to the heading indicator, and for selecting the vehicle headings calculated by the second compass controller after the automatic calibration routine has acquired sufficient data from the magnetic field sensor to calibrate the compass system. The heading indicator may include a display and/or an audio messaging device for generating audible vehicle heading messages. If such an audible messaging device is employed, the device may also be used to record and playback dictated memos.

26 Claims, 8 Drawing Sheets

DUAL-CALIBRATED COMPASS

BACKGROUND OF THE INVENTION

The present invention relates to magnetic direction sensing systems and particularly those for use in vehicles.

Figure 1:
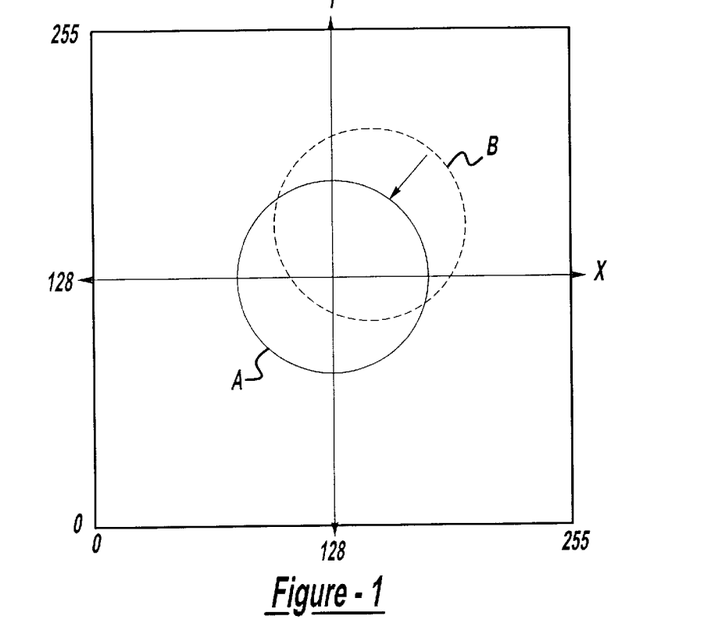
FIG. 1 is a graph illustrating the ideal signal representing the sensed magnetic field of the earth when the vehicle travels in a 360 degree loop, and the signal after a change in vehicular magnetism.

U.S. Pat. No. 4,953,305, assigned to the present assignee, discloses a magnetic field sensor and microprocessor-controlled compass system for a vehicle. The system senses the magnitude of the earth's magnetic field in two channels of measurement. The sensor data, if plotted on an X–Y coordinate plane, would be as shown in FIG. 1. For a properly calibrated compass, the plot of sensor data creates a perfect circle centered around the origin of the coordinate plane when the vehicle travels in a 360 degree loop, as indicated by graph A of FIG. 1. The radius of the circle represents the detected earth's magnetic field strength, and the vehicle's compass heading at a particular time during travel is represented by a point on the circle. By calculating the angle which the point forms with the X–Y coordinate plane, the compass heading of the vehicle may be determined. As is known, depending on the location of the vehicle, the detected magnitude of the earth's magnetic field can vary significantly.

The sensed magnetic field will also be affected if there is a change in vehicular magnetism. Changes in the magnetism of a vehicle can be caused by, for example, driving the vehicle near the electrical power feeders of train or subway systems, installing a magnetic cellular antennae on the vehicle's roof, parking under an AC powerline, or even driving through a car wash which can flex the sheet metal in the vicinity of the compass sensor and change its magnetic characteristics. Such a change in vehicular magnetism will cause the magnetic field sensed by the compass channels when the vehicle is heading in a given direction to be either greater or lesser than that expected for a vehicle with no magnetic interference. As a result, the plot of sensor data will be shifted away from the origin of the coordinate plane in some direction, resulting in a pattern such as the circle shown as graph B of FIG. 1 when the vehicle travels a 360 degree loop. The magnitude of the shift of sensor data from the origin is proportional to the magnitude of the change in vehicular magnetism.

The compass system of the above-mentioned patent provides automatic and continuous calibration to account for changes in the vehicle's magnetism and thus the system's reaction to the earth's magnetic field during the life of the vehicle. The calibration system includes means for testing the data received from the compass sensor to determine the maximum and minimum signal levels during movement of the vehicle through a completed 360 degree path of travel. This data is averaged over several such paths of vehicular travel to provide continuously updated and averaged compensation correction information. The automatic and continuous calibration is capable of correcting the compass system when the plot of sensor data experiences small shifts away from the origin of the coordinate plane due to small drifts in vehicular magnetism. The origin of the coordinate plane in these circumstances is still contained within the circle plotted when the vehicle travels a 360 degree loop, and the crossings of the sensor data on the axes of the coordinate plane are used to calculate the spans of the signal levels along each axis which determine the center of the circular plot of sensor data. Compensation signals are then generated based on the difference between the center of the circle and the origin of the coordinate plane. However, if the shift of sensor data is large enough such that the origin of the coordinate plane is not contained within the circular plot of sensor data created when the vehicle travels a 360 degree loop, then heading information cannot be calculated and the calibration system cannot provide correction in this somewhat unusual situation unless the sensor data experiences a subsequent shift that causes the origin of the coordinate plane to again be contained. Because such a subsequent shift may never occur or, if it does, may occur only after an undesirably long period of time, the compass system of the above-mentioned patent provides means to reinitiate calibration in these situations.

Figure 2:
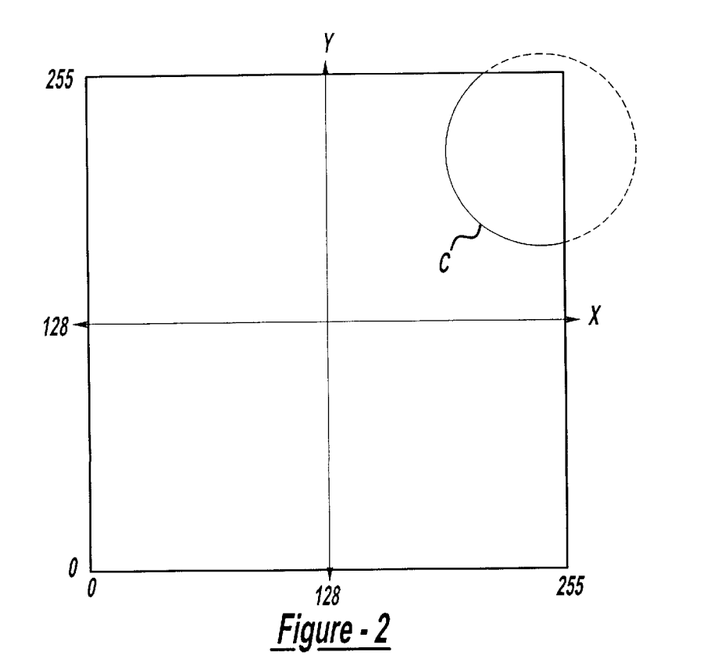
FIG. 2 is a graph illustrating the signal representing the sensed magnetic field of the earth after a large change in vehicular magnetism causing the saturation limits of the compass to be exceeded.
Figure 3:
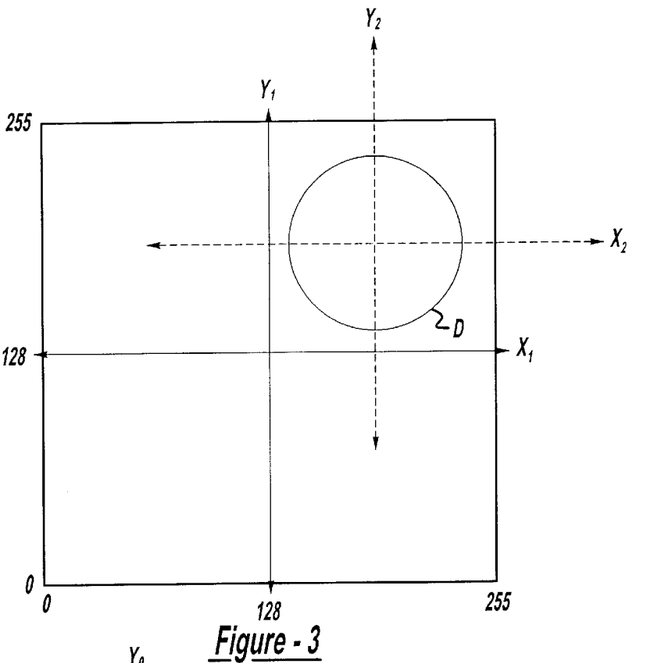
FIG. 3 is a graph illustrating the signal representing the sensed magnetic field of the earth after an intermediate change in vehicular magnetism.

Reinitiation of calibration involves the collecting and centering of spans of sensor data followed by the collecting and centering of two circles of sensor data which causes the origin of the coordinate plane to coincide with the center of the circular plot of sensor data. As such, the reinitiation process enables the compass system to recover from any change in vehicular magnetism and to provide accurate heading information. In order to detect situations where reinitiation of the calibration system is desirable, it is known to have the compass system maintain saturation limits at the outer boundaries of the range of measurement of the sensor data. For 8-bit sensor data, these saturation limits are at 0 and 255, as shown in FIG. 1. If a large change in vehicular magnetism causes the sensor data to shift and the current data is plotted outside of these limits for a continuous period of five minutes, then calibration is restarted. Such a shift is shown by graph C of FIG. 2, with the dashed portion thereof indicating the range of heading directions of the vehicle that would cause the sensor data to remain outside of the saturation limits. However, intermediate changes in vehicular magnetism are possible which, while causing the plot of sensor data to shift and to not contain the origin of the coordinate plane when the vehicle completes a 360 degree loop, do not cause the sensor data to be plotted outside of the saturation limits. Such a shift is shown by graph D of FIG. 3. As such, it is known to also provide for a reinitiation of calibration if 15 ignition cycles of at least 5 minutes duration are completed without obtaining a crossing point on the axes of the X–Y coordinate plane. Furthermore, it is known to enable the operator of the vehicle to manually reinitiate calibration by operating a switch, button, or the like. Manual reinitiation would most likely occur when the operator notices that the displayed heading information is erroneous for an extended period of time. The above-mentioned means by which to cause reinitiation of calibration enables the compass system to ultimately recover from changes in vehicular magnetism of any magnitude.

Because automatic calibration routines are intended to compensate for the specific vehicular magnetism of the vehicle in which the compass is installed, and because vehicular magnetism can vary greatly from one vehicle to the next, such automatic calibration routines cannot be calibrated before or during installation at the vehicle assembly plant. To acquire sufficient data from the magnetic sensors to have a high level of confidence that the compass system is properly calibrated, automatic calibration routines such as that described above, typically require that the vehicle be driven through at least one 360 degree loop and preferably through two or three 360 degree loops. However, because space constraints at an assembly plant typically do not permit vehicles to be driven in this many loops, newly manufactured vehicles having such compass systems, are typically transported to dealerships before the automatic calibration routine is able to properly calibrate the compass. If these vehicles are not subsequently driven in a sufficient number of loops to calibrate the compass prior to delivery to the buyer, the buyer may be led to believe that the compass system is defective. Due to a large number of warranty claims arising under these circumstances, some automobile manufacturers have now required that suppliers of compass systems ensure that they are precalibrated so as to compensate for any expected vehicular magnetism prior to delivery to the dealerships. The precalibration data used to calibrate the compass would, for example, correspond to average compensation data used for vehicles of a particular make and model.

As noted above, however, vehicular magnetism can vary considerably from vehicle to vehicle even for vehicles of the same make and model. Such variance in magnetism may arise from various options included in these vehicles, such as larger fuel tanks and/or engines. Given this variance in vehicular magnetism, a compass system that is precalibrated correctly for one vehicle may not be properly calibrated for another vehicle of the same model. Thus, absent some mechanism for recalibrating such compass systems after installation, there remains a likelihood that most precalibrated compass systems may not operate properly. Further, when compass systems are calibrated solely using precalibration data, there would be no mechanism in place for correcting any changes in vehicular magnetism that may arise after the vehicle has left the assembly plant.

One approach to solving some of the above-noted problems is to provide an automatically-calibrating compass system that utilizes precalibration data to initially calibrate the compass system until a predetermined event occurs that would initiate the automatic calibration routine. In one such implementation, the compass system initially calculates the vehicle heading utilizing the precalibration data until it is determined that the signal levels output from the sensors have saturated in a manner similar to that discussed above with respect to the automatic calibration routine disclosed in U.S. Pat. No. 4,953,305. Thus, when the compass system determines that 15 ignition cycles of at least 5 minutes duration are completed without obtaining a crossing point on the axes of the X–Y coordinate plane while utilizing the precalibration data, the compass system initiates the automatic calibration routine which then begins accumulating data for purposes of recalibrating the compass system. Another manner of implementing this approach is disclosed in U.S. Pat. No. 5,390,122 issued to Michaels et al. This patent discloses a compass system that initiates an automatic calibration routine for subsequent recalibration of the compass system after the vehicle is first driven at a speed exceeding 10 miles per hour.

One problem with the above approach is that the automatic calibration routine implemented in such compass systems will not have acquired any data needed to properly automatically calibrate the compass at the time at which the automatic compass routine is placed in control of calculating the displayed heading. Thus, it is still possible that the compass system may not be properly calibrated when the vehicle is delivered to the buyer. Additionally, if, prior to delivery to the buyer, the vehicle has not been driven over 10 miles per hour or the compass is inaccurately precalibrated but not yet in a saturated state, the compass system will remain calibrated with the precalibration data at the time of delivery. Subsequently, when the buyer drives the vehicle in excess of 10 miles per hour or the compass becomes saturated, the displayed vehicle heading may abruptly change since the automatic calibration routine has not acquired any data needed for automatic calibration, thereby causing the buyer to believe that the compass system is malfunctioning.

Current vehicle compass systems include some form of visual indication for informing the vehicle occupants of the vehicle heading. The most common form of visual indicator is an electronic display positioned in an overhead console or in a rearview mirror. Such electronic displays are, however, relatively expensive and impose certain constraints on the size and placement of the compass system within the vehicle interior. It would be desirable to provide the operator with an alternate form of compass heading information.

SUMMARY OF THE INVENTION

An aspect of the present invention is to provide an electronic vehicle compass system that overcomes the above-mentioned problems. An additional aspect of the present invention is to provide an electronic compass system that seamlessly switches from a heading calculated using precalibration data to a heading calculated by an automatic calibration routine. Yet another aspect of the present invention is to provide a vehicle compass system that vehicle purchasers will not perceive as misfunctioning solely because an insufficient amount of data has been acquired to properly automatically calibrate the compass prior to displaying a vehicle heading calculated by the automatic calibration routine.

To achieve these and other aspects and advantages, the electronic compass system of the present invention comprises a magnetic field sensor for detecting the earth's magnetic field and for providing electrical signals representing the direction of the vehicle in relation to the earth's magnetic field, a heading indicator for indicating vehicle headings in response to received vehicle heading signals, and a processor coupled to the magnetic field sensor for receiving the electrical signals and coupled to the heading indicator for supplying the vehicle heading signals to the heading indicator. The processor includes first compass control means for calculating vehicle headings in response to the received electrical signals using precalibration data to compensate for expected vehicular magnetism, second compass control means for calculating vehicle headings in response to the received electrical signals using an automatic calibration routine to compensate for actual vehicular magnetism, and control transfer means for initially selecting the vehicle headings calculated by the first compass control means to be represented by the vehicle heading signals supplied to the heading indicator, and for selecting the vehicle headings calculated by the second compass control means after the automatic calibration routine has acquired sufficient data from the magnetic field sensor to calibrate the compass system. Preferably, the control transfer means selects the vehicle headings calculated by the second compass control means when a vehicle heading calculated by the first compass control means is the same as a vehicle heading calculated by the second compass control means.

Still another aspect of the present invention is to provide a vehicle compass system that does not require an electronic display to inform the vehicle occupants of the current vehicle heading. To achieve this and other aspects and advantages, the electronic compass system of the present invention comprises a magnetic field sensor for detecting the earth's magnetic field and for providing electrical signals representing the direction of the vehicle in relation to the earth's magnetic field, memory means for storing a plurality of prestored audio messages each corresponding to a different vehicle heading, a processor coupled to the magnetic field sensor for receiving the electrical signals and calculating a vehicle heading in response to the electrical signals. The processor is also coupled to the memory means for selecting for playback one of the plurality of prestored audio messages that corresponds to the calculated vehicle heading. The compass system further includes a transducer coupled to the processor and the memory means for audibly generating the selected prestored audio message to provide the heading indication.

These and other features, advantages, and objects of the present invention will be further understood and appreciated by those skilled in the art by reference to the following specification, claims, and appended drawings.

DETAILED DESCRIPTION OF PREFERRED EMBODIMENTS

Figure 4:
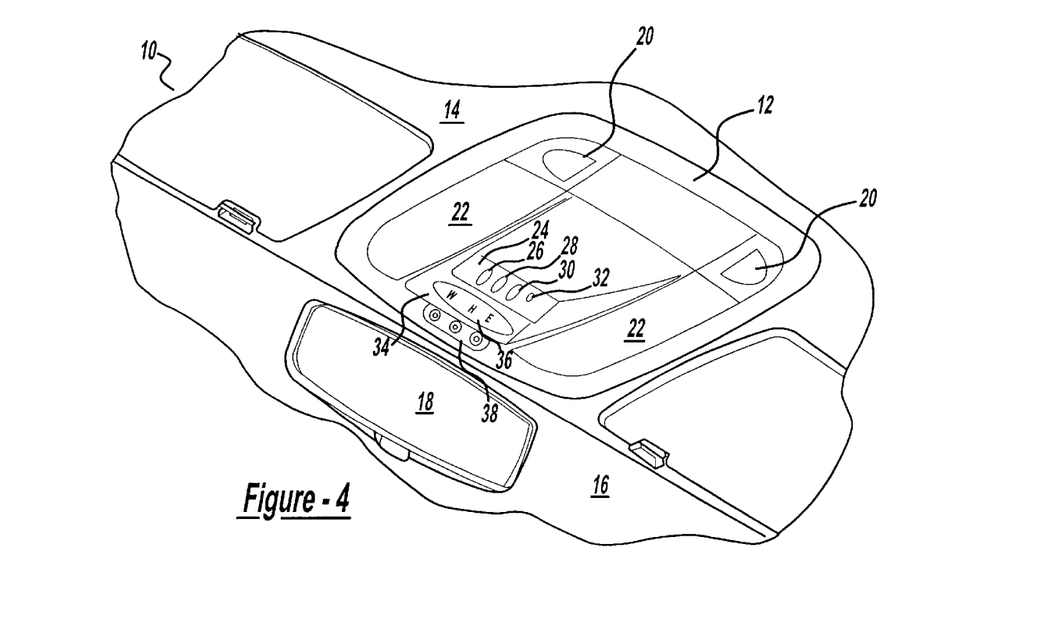
FIG. 4 is a fragmentary perspective view of a vehicle embodying the present invention.

In FIG. 4, there is shown a vehicle 10 such as an automobile which includes an overhead console 12 mounted to the roof 14 of the vehicle during manufacture, although it could be separately added at a later time. Console 12 is centered near the top edge of windshield 16 typically above the rearview mirror 18 and includes a pair of switches 20 for operating lamps positioned behind lenses 22 which in turn direct illumination into the lap area of either the driver or passenger side of the vehicle depending on which switch is actuated. The center of the console may include a trainable garage door opening transmitter 24 of the type disclosed in U.S. Pat. No. 5,442,340. This trainable transmitter can learn the RF frequency, modulation scheme, and security code of three or more existing remote transmitters. Thus, console 12 including trainable transmitter 24, can replace at least three separate remote control transmitters usually loosely stored in the vehicle. The transmitter includes three control switches 26, 28, and 30 and an indicator LED 32 for the display of training prompting information to the vehicle operator. Console 12 also includes a display panel 34, the center of which includes a digital display 36 providing, in one embodiment of the invention, a 16-point compass display of the vehicle heading. Console 12 also includes compass and display control switches 38 and the compass circuit shown in FIG. 5 which is appropriately mounted therein.

Figure 5:
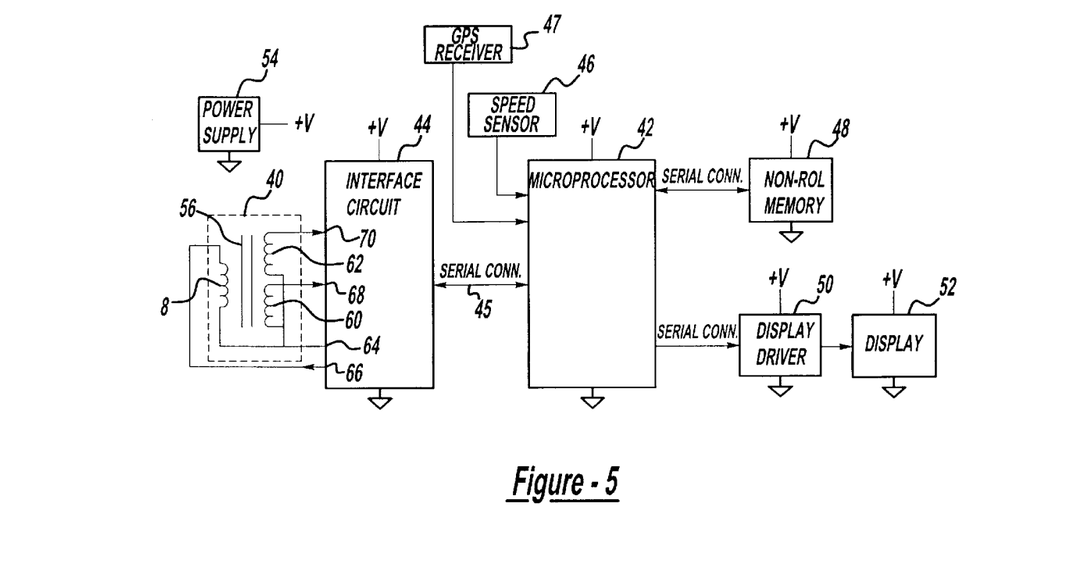
FIG. 5 is an electrical circuit diagram in block and schematic form of a first embodiment of the compass system of the present invention.

Referring now to FIG. 5, the compass system according to a first embodiment includes a magnetic field sensor 40 coupled to a microprocessor 42 through an electrical interface circuit 44. In the preferred embodiment, microprocessor 42 is a HC05 8-bit microprocessor manufactured by the Motorola Corporation. Microprocessor 42 and circuit 44 are coupled via serial communication line 45, and comprise a processing circuit for processing electrical signals generated from sensor 40. Also coupled to microprocessor 42 in a conventional manner is a speed sensor 46 for detecting vehicle movement, a GPS (Global Positioning System) receiver or communication circuit 47 for obtaining satellite-based vehicle position information, a nonvolatile memory (NVM) circuit 48 for storing compass data, a display driver 50, and a display 52 for displaying heading information to the operator of the vehicle in response to display output signals generated by microprocessor 42. In one embodiment, speed sensor 46 can be an inductive pick-up from the drive shaft of the vehicle and from which a frequency-based speed signal is obtained which provides a certain number of pulses per mile traveled by the vehicle. Display 52 is a 16-point display in the preferred embodiment, although it can be any type of display including an alphanumeric- or graphictype display. Power supply circuit 54 provides operating voltage to all of the components of the compass system. The functioning and interconnection of these circuits is now described in greater detail.

Sensor 40 may be a flux-gate sensor or any other type of magnetic field sensor. Sensor 40 includes an annular core 56 around which is wound a primary winding 58, a secondary east/west sensing winding 60, and a secondary north/south sensing winding 62. Terminal 64 of circuit 44 is held at 2.5 volts and provides an intermediate reference ground for the windings of sensor 40. Primary winding 58 is driven by 0- to 5-volt signals supplied from terminal 66 of circuit 44 to selectively drive annular core 56 into saturation. Secondary sensing windings 60 and 62 supply electrical signals representing the magnetic field sensed within the vehicle to terminals 68 and 70, respectively, of circuit 44 in a well-known manner.

Circuit 44 essentially serves as an interface between sensor 40 and microprocessor 42, performing the same functions as the corresponding individual circuit components of the interfacing circuitry detailed in U.S. Pat. No. 4,953,305, issued on Aug. 4, 1990, entitled VEHICLE COMPASS WITH AUTOMATIC CONTINUOUS CALIBRATION, assigned to the present assignee and incorporated herein by reference. Interface circuit 44 preferably is an application specific integrated circuit (ASIC) essentially incorporating the individual circuits of the prior interfacing circuitry in a conventional manner to reduce the cost of the compass system. Circuit 44 converts the analog electrical signals supplied by sensing windings 60 and 62 to 8-bit digital signals (count values). These digital signals represent the magnetic field strength, in milligauss, detected by sensing windings 60 and 62 representing the two channels of compass information. In the preferred embodiment, each count of these count values represents five milligauss of magnetism. The digital signals are supplied to microprocessor 42 over serial communication line 45.

The digital signals supplied by circuit 44 to microprocessor 42, representing the magnetic field sensed by the north/south and east/west channels of sensor 40, can be plotted on an X–Y coordinate plane, as shown in FIGS. 1–3 and 6. The magnetic field strength, in milligauss, of the east/west channel is represented by the X-axis, and the magnetic field strength, in milligauss, of the north/south channel is represented by the Y-axis. As mentioned above, the plotted channel data of a properly calibrated compass creates a perfect circle centered around the origin of the coordinate plane when the vehicle travels in a 360 degree loop, as indicated by graph A of FIG. 1. The radius of the circle represents the earth's magnetic field strength, and the vehicle's compass heading at a particular time during travel is represented by a point on the circle. By calculating the angle which the point forms with the X–Y coordinate plane, the compass heading of the vehicle may be determined. If a change in vehicular magnetism occurs, the magnetic field sensed by the compass channels when the vehicle is heading in a given direction will be either greater or lesser than that expected for a vehicle with no magnetic interference. As such, the plot of digital sensor data will be shifted away from the origin of the coordinate plane in some direction, and will result in a circle such as that shown by graph B of FIG. 1 when the vehicle travels a 360 degree loop.

Figure 6:
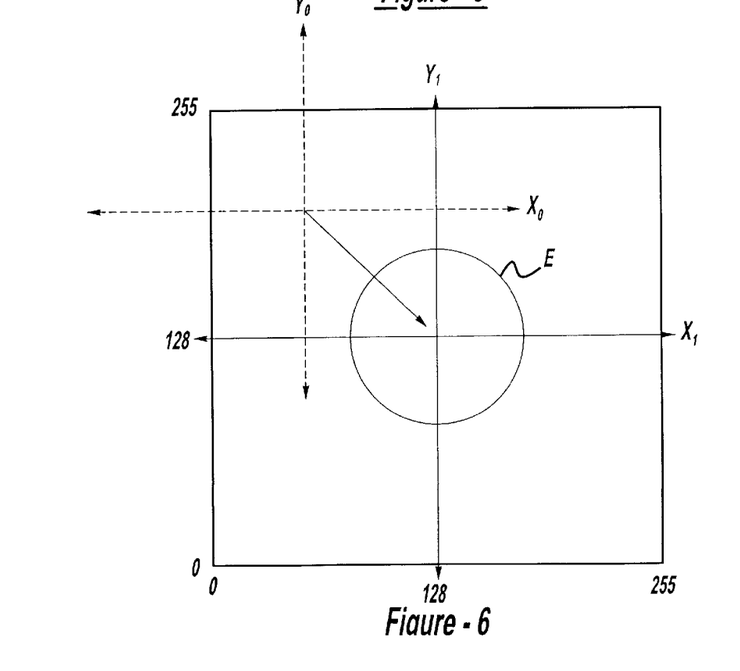
FIG. 6 is a graph illustrating the signal representing the sensed magnetic field of the earth following calibration by compensating the display signals sent to the compass display of the present invention.

Microprocessor 42 processes the digital signals supplied by circuit 44 and generates compass compensation data, if necessary, to account for changes in vehicular magnetism. This compensation data may be used to generate compensation signals that are supplied to circuit 44 via serial communication line 45 and, after conversion therein from digital to analog, are supplied directly to secondary sensing windings 60 and 62 via terminals 68 and 70, respectively. In particular, DC currents are supplied to sensing windings 60 and 62 which create a static magnetic field that interacts with the field being measured by sensor 40. For a properly calibrated compass, this combined field eliminates the effects of any magnetic interferences such that sensor 40 provides analog electrical signals representative only of the magnetic field of the earth so that accurate heading information can be provided. The effect of such compensation is illustrated in FIG. 1 where circular plot B would be effectively moved relative to a stationary X–Y coordinate plane such that the center of the circle coincides with the origin of the X–Y coordinate plane (as illustrated by circle A). Other methods of compass compensation may similarly be employed. For example, circuit 44 may supply voltage or frequency signals to compensate sensor 40 which, as mentioned above, may be any type of magnetic field sensor. Furthermore, correction may be achieved by compensating the signals supplied to display 52 instead of altering the sensing of the magnetic field itself, as described above. The effect of this form of correction is to effectively move the origin of the X–Y coordinate plane to coincide with the circular plot which is stationary, as illustrated in FIG. 6.

Like the prior art precalibrated vehicle compass systems that utilize an automatically-calibrated compass, the compass system of the present invention likewise initially calculates the vehicle's heading utilizing precalibration data. Unlike the prior art systems, however, the compass system of the present invention does not wait to calibrate the automatically-calibrated compass until after it is required to calculate the displayed vehicle heading. Instead, the compass of the present invention allows for the automatically-calibrated compass to acquire data and calibrate during the time in which the displayed vehicle heading is calculated utilizing the precalibration data. Further, the present invention preferably compares the headings computed utilizing the precalibration data and utilizing the automatically-calibrated compass in order to wait until there is a match of the vehicle headings before switching control of the compass system entirely over to the automatically calibrated compass.

As will be apparent from the following description of the operation of microprocessor 42 in the compass system of the present invention, both the automatically-calibrated compass and the precalibrated compass share the same hardware components and are implemented through the simultaneous execution of programming routines that calculate vehicle headings utilizing either the precalibration data or the compensation data generated by the automatically-calibrated compass.

To perform the functions in accordance with the present invention, microprocessor 42 is preferably programmed to perform the functional steps as illustrated in FIGS. 7A–7D. The process carried out by microprocessor 42 is implemented as a task polling procedure 100 wherein certain tasks are performed within designated time intervals as defined by task flags that are set after the completion of a predetermined number of clock cycles. Specifically, the first task flag that is considered by microprocessor 42 in performing the task polling routine, is to determine whether a 6.4 SECOND TASK flag has been set (step 102). The 6.4 SECOND TASK flag is set when a counter counts the occurrence of a predetermined number of clock pulses representing a 6.4 second time interval. After the tasks associated with the 6.4 SECOND TASK flag have been completed, this task flag is cleared until the counter once again sets the flag after another 6.4 second interval.

Figure 7A:
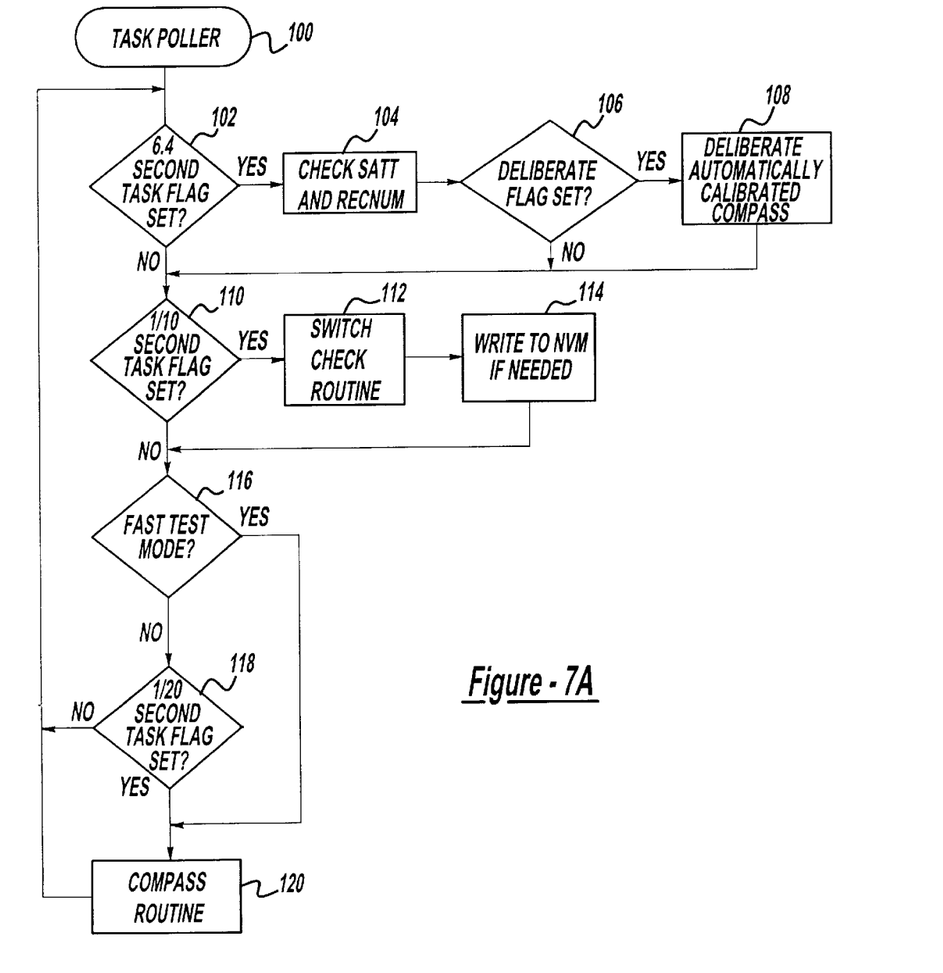
FIGS. 7A–7D are flow diagrams representing the flow of operational steps performed by the processor of the compass system in accordance with the present invention.

In step 102, if microprocessor 42 determines that the 6.4 SECOND TASK flag has been set, it then checks the SATT and RECNUM flags in step 104. Microprocessor 42 checks the SATT flag to determine whether the levels of the signals output from sensor 40 have exceeded a saturation level for a predetermined interval of time (i.e., five minutes). The SATT flag is set whenever it is determined that the output signal level from any one of sensing coils 60 or 62 are above a threshold saturation level. When the SATT flag is first set, a counter commences counting clock cycles until it reaches a predetermined value or until it is reset when the SATT flag is cleared as a result of the signal levels output from sensing coils 60 and 62 falling back below the threshold saturation level before the predetermined number of clock cycles are counted. If the SATT flag is continuously set for the predetermined time interval, the DECALIBRATE flag is set.

With respect to the RECNUM flag, a five minute timer is incremented every 6.4 seconds. If the vehicle is on for more than five minutes, and not one "crossing" (i.e., crossing any one of the axes by magnetic data) has been detected, RECNUM is incremented. RECNUM is subsequently incremented a maximum of once per ignition cycle provided a "crossing" has not been detected. If RECNUM reaches a predetermined count value, such as fifteen, the DECALIBRATE flag is set.

Microprocessor 42 checks the status of the DECALIBRATE flag in step 106 and decalibrates both the automatically-calibrated compass and the precalibrated compass in step 108 if the DECALIBRATE flag has been set. If the DECALIBRATE flag had not been set prior to step 106, microprocessor 42 skips step 108 and checks whether a 1/10 SECOND TASK flag has been set in step 110. The 1/10 SECOND TASK flag is set in a similar manner manner as the 6.4 SECOND TASK flag except that the count value of clock cycles has a smaller value. If the 1/10 SECOND TASK flag has not been set, microprocessor 42 checks whether it is operating in the fast test mode in step 116. Otherwise, if the 1/10 SECOND TASK flag has been set, microprocessor 42 performs a switch check routine (step 112), which is described in detail below with reference to FIG. 7B.

The purpose of the switch check routine 112 is to determine whether any of the compass switches 38 have been pressed such that microprocessor 42 should respond by performing a designated function. If microprocessor 42 determines in step 122 (FIG. 7B) that no button has been pressed, it returns to step 114 (FIG. 7A) as illustrated by block 136. If a button has been pressed, microprocessor 42 detects this in step 122 and then determines whether it is to respond to the pressing of the button by setting the geographic zone variable of the compass in step 124 or whether it is to decalibrate the compass and transfer control from the precalibrated compass to the automatically-calibrated compass in step 128. It will be understood by those skilled in the art that separate buttons may be provided for manually instructing microprocessor 42 to perform these separate functions, or a single button could be provided that would enable one of the two functions depending upon how long the button has been depressed. In any event, if microprocessor 42 is to respond to the pressing of a button by setting the geographic zone variable, it performs this task in step 126 in accordance with known techniques.

Figure 7B:
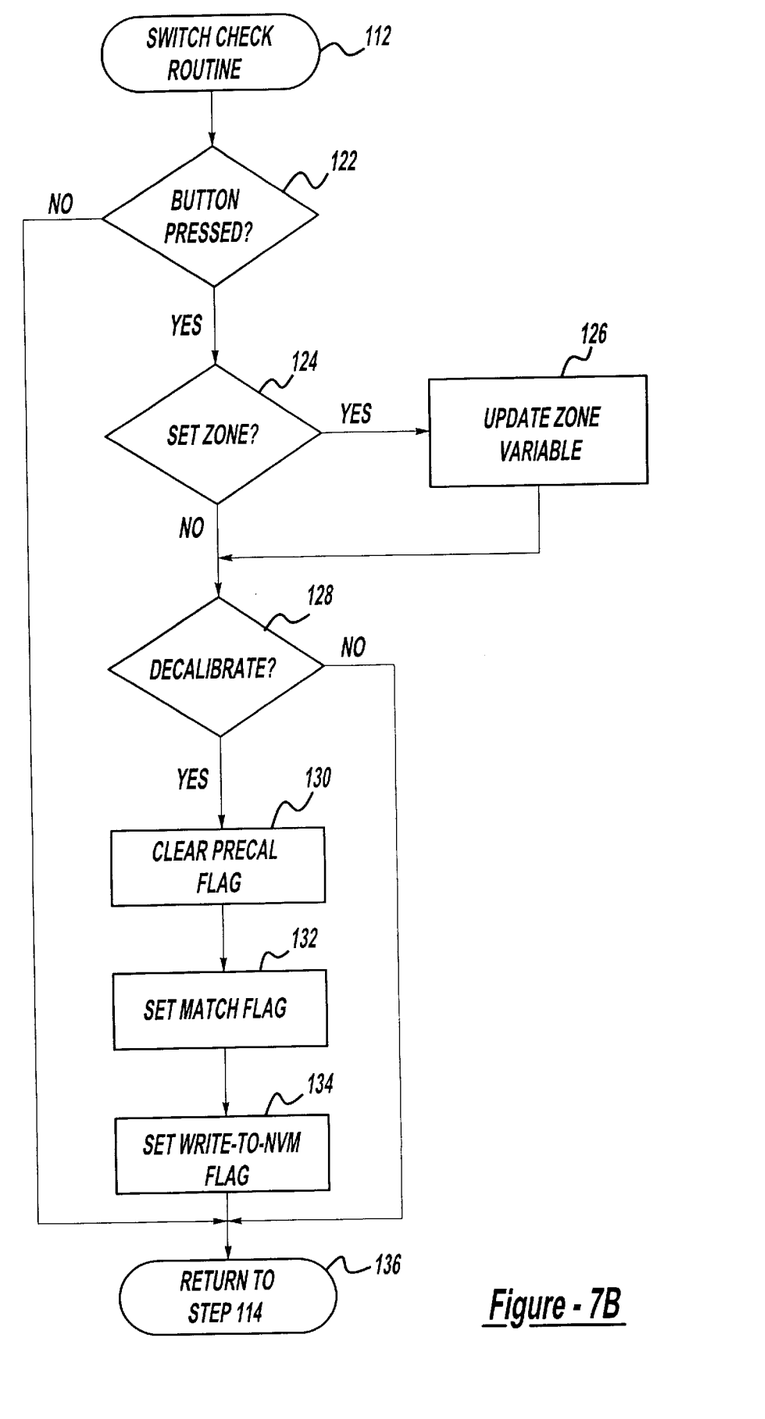

If microprocessor 42 determines in step 128 that a manual command has been received to decalibrate the compass system and to transfer control of the compass display from the precalibrated compass to the automatically-calibrated compass, microprocessor 42 clears a PRECAL flag in step 130. As is described below in more detail, the PRECAL flag is set in an initial default condition such that microprocessor 42 enables the precalibrated compass system to have control over the heading that is displayed on display 52. The PRECAL flag is cleared only in response to a manual command that would be detected in step 128 or when microprocessor 42 determines that the automatically-calibrated compass has acquired a sufficient amount of data from sensor 40 to be accurately calibrated.

After clearing the PRECAL flag in step 130, microprocessor 42 then sets the MATCH flag in step 132. By default, the MATCH flag is in a cleared state and is only set when a manual command is recognized in step 128 to transfer control to the automatically-calibrated compass or when microprocessor 42 has determined that the automatically-calibrated compass has been calibrated and that the heading computed using the precalibrated compass matches that computed by the automatically-calibrated compass. As described in more detail below, microprocessor 42 will only transfer control from the precalibrated compass to the automatically-calibrated compass when it determines that the MATCH flag has been set.

Microprocessor 42 next sets a WRITE-TO-NVM flag in step 134 to which microprocessor 42 will subsequently respond by writing data including the values of the flags into NVM 48. After the WRITE-TO-NVM flag has been set, microprocessor 42 returns to step 114 (FIG. 7A) as indicated in block 136. In step 114, microprocessor 42 checks whether the WRITE-TO-NVM flag has been set and writes any data into NVM 48 if that flag has been set.

Subsequently, microprocessor 42 checks whether it is operating in a fast test mode (step 116). The fast test mode is a mode that may be entered only in response to commands from the manufacturer for purposes of conducting tests on the compass system. If operating in a fast test mode, microprocessor 42 bypasses step 118 and proceeds directly to a compass routine 120. If microprocessor 42 is not in the fast test mode, it checks whether a 1/20 SECOND TEST flag has been set in step 118. If this flag has not been set, microprocessor 42 then executes steps 102, 110, 116, and 118 until one of the task flags has been set or the compass system is instructed to enter the fast test mode. If the 1/20 SECOND TASK flag has been set, microprocessor 42 detects this in step 118 and advances to the compass routine 120, which is described below with reference to FIG. 7C.

Figure 7C:
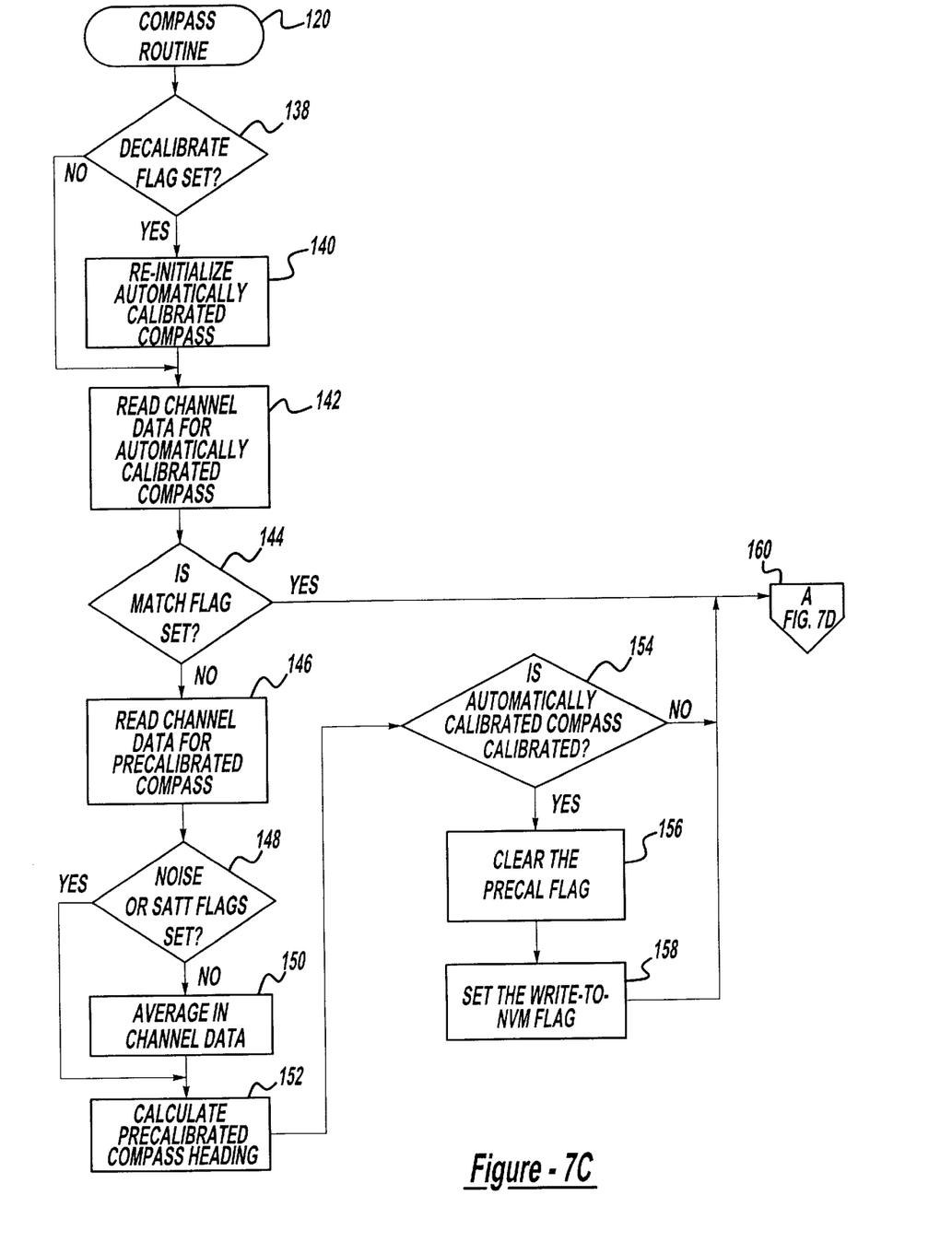

Compass routine 120 begins with step 138 in which microprocessor 42 checks whether the DECALIBRATE flag has been set. This flag may be set in step 104 (FIG. 7A) or in step 128 (FIG. 7B) if the signal levels output from sensor 40 have been saturated for a predetermined time period or if a manual command has been received to decalibrate the compass. If microprocessor 42 determines in step 138 that the DECALIBRATE flag has been set, microprocessor 42 reinitializes the automatically-calibrated compass in step 140.

Otherwise, if the DECALIBRATE flag has not been set, step 140 is bypassed. Next, microprocessor 42 reads the channel data from sensing coils 60 and 62 for processing by the automatically-calibrated compass (step 142). Microprocessor 42 then checks whether the MATCH flag has been set in step 144. If the MATCH flag had been set, the process advances to step 162 (FIG. 7D) as illustrated by connector block 160. If the MATCH flag has not been set, microprocessor 42 processes data for the precalibrated compass by first reading the channel data from sensing coils 60 and 62 for the precalibrated compass in step 146.

Next, microprocessor 42 checks whether the NOISE or SATT flags have been set in step 148. As discussed above, the SATT flag represents whether the signal levels output from sensor 40 is saturated. The NOISE flag is set if the detected signal levels are outside a second set of threshold levels indicating that the detected signal levels represent a heading that is unlikely to occur given the prior heading thereby indicating the potential presence of noise. If either of these flags have been set, microprocessor 42 discards the channel data read in step 146 and calculates the precalibrated compass heading based upon the channel data previously received (step 152). If the NOISE or SATT flags are not set, microprocessor 42 first averages the channel data received in step 146 with the previous channel data (step 150) prior to calculating the precalibrated compass heading in step 152.

After the precalibrated compass heading has been computed, microprocessor 42 then checks whether the automatically-calibrated compass is calibrated in step 154. The determination as to whether the automatically-calibrated compass is calibrated, depends upon the particular automatic calibration technique employed. For example, if the automatic calibration routine that is disclosed in U.S. Pat. No. 4,953,305 is employed, the automatically-calibrated compass will be deemed to have been calibrated after a sufficient amount of channel data has been processed to determine that the vehicle has traveled through at least one 360 degree loop, and preferably three 360 degree loops such that an average of the data accumulated during these three loops may be used for the calibration.

If the automatically-calibrated compass is not yet calibrated, the process proceeds to step 162 (FIG. 7D) as indicated by connector block 160. If it is determined that the automatically-calibrated compass is calibrated, microprocessor 42 clears the PRECAL flag in step 156 and sets the WRITE-TO-NVM flag in step 158 prior to proceeding to step 162 in FIG. 7D.

Figure 7D:
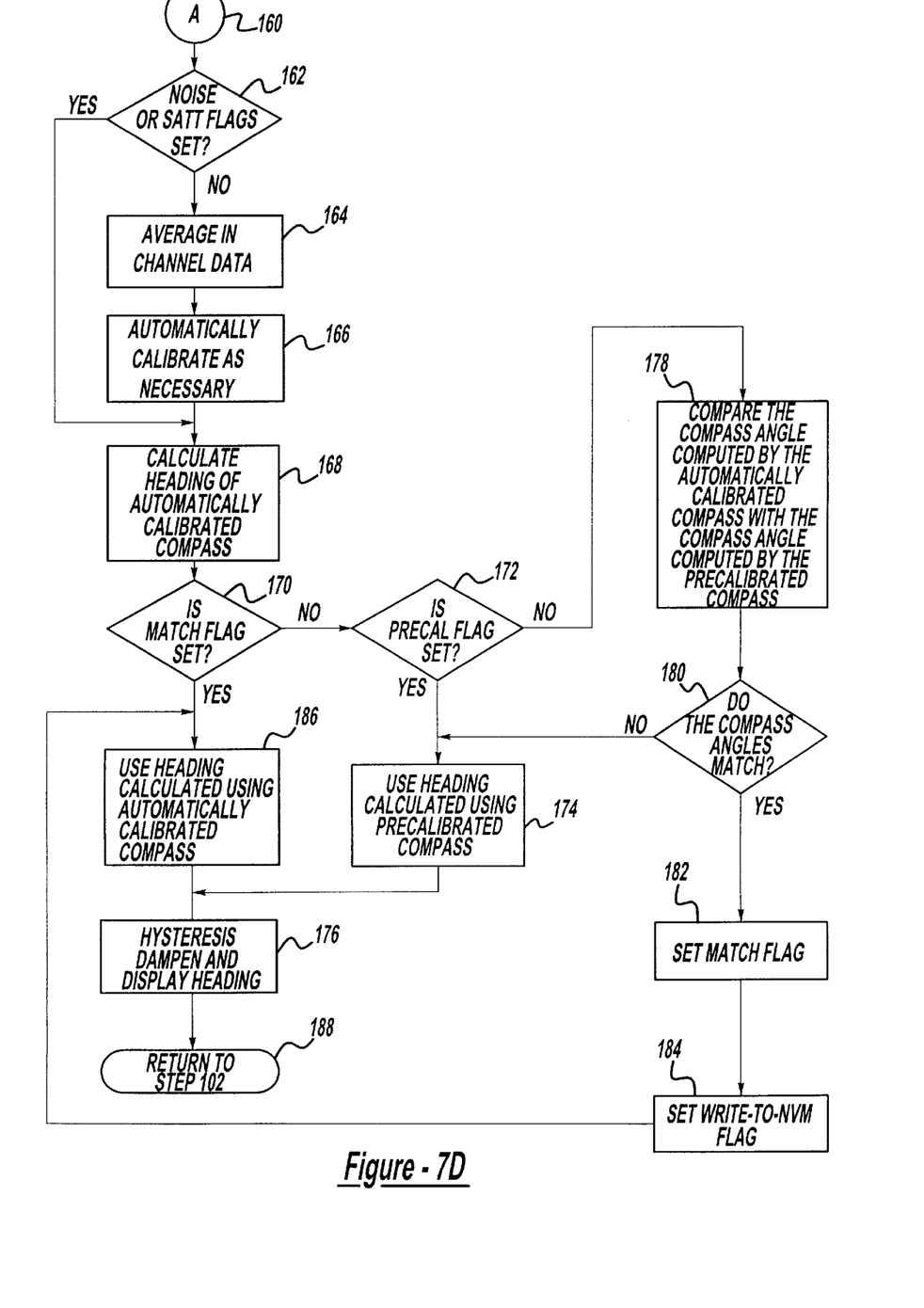

In steps 162–168 described below, microprocessor 42 processes the channel data read for the automatically-calibrated compass during execution of step 142 regardless of whether the precalibration compass heading is the heading displayed on the compass display. This enables the automatically-calibrated compass to perform its automatic calibration transparent to the user such that it may take control of the heading display function of the compass system at a time when it is already fully calibrated.

In general, microprocessor 42 performs an automatic calibration routine by first checking whether the NOISE or SATT flags have been set in step 162 in a similar manner as in step 148 such that abnormal data is discarded. Thus, if the NOISE or SATT flags are set, microprocessor 42 skips steps 164 and 166 and proceeds to step 168 where it calculates the heading of the automatically-calibrated compass utilizing the previously-acquired channel data. If the NOISE or SATT flags have not been set, microprocessor 42 averages in the channel data acquired in step 142 with the previously-acquired channel data (step 164) and automatically recalibrates the automatically-calibrated compass as necessary (step 166) prior to calculating the heading of the automatically-calibrated compass in step 168. The detailed steps of the preferred method of automatic calibration are disclosed in U.S. Pat. No. 4,953,305, the disclosure of which is incorporated herein by reference. Those skilled in the art will appreciate, however, that other automatic calibration processes and techniques may be used without departing from the spirit and scope of the present invention.

After the automatically-calibrated compass has calculated a heading in step 168, microprocessor 42 then checks whether the MATCH flag has been set in step 170. If the MATCH flag has been set, microprocessor 42 selects the heading calculated using the automatically-calibrated compass (step 186), dampens the calculated heading using a hysteresis, and then displays the calculated heading on display 52 (step 176). The dampening step is employed to prevent the displayed heading from rapidly changing back and forth between adjacent headings when the vehicle is travelling in a direction that is the dividing line between two adjacent headings. Subsequently, the process returns to step 102 in FIG. 7A as indicated by block 188.

If microprocessor 42 determines in step 170 that the MATCH flag has not been set, microprocessor 42 determines if the PRECAL flag is set. If the PRECAL flag is set, microprocessor 42 recognizes that the automatically-calibrated compass has not yet been calibrated, and therefore selects the heading calculated using the precalibrated compass in step 174 prior to dampening the calculated heading and displaying it in step 176. If the PRECAL flag has been cleared, microprocessor 42 compares the heading computed by the automatically-calibrated compass with the heading calculated using the precalibrated compass (step 178). In step 180, microprocessor 42 determines whether these headings match. If the headings do not match, microprocessor 42 does not select the heading from the automatically-calibrated compass, but instead selects the heading calculated using the precalibrated compass (step 174) for display on compass display 52 (step 176).

If the two headings match, microprocessor 42 sets the MATCH flag in step 182 and then sets the WRITE-TO-NVM flag in step 184. Once the MATCH flag has been set, microprocessor 42 thereafter selects the heading calculated using the automatically-calibrated compass as indicated in step 186 for display on the compass display (step 176). Further, when the MATCH flag has been set, the above-described steps in which the compass system calculates a vehicle heading utilizing precalibration data, are bypassed.

As noted above, various different automatic calibration routines and precalibration techniques may be implemented in practicing the present invention without departing from the spirit and scope thereof. For example, the automatic calibration techniques disclosed in any of the following may be employed in practicing the present invention: U.S. Pat. No. 5,737,226 entitled VEHICLE COMPASS SYSTEM WITH AUTOMATIC CALIBRATION, filed Jun. 5, 1995; U.S. Pat. No. 5,878,370 entitled VEHICLE COMPASS SYSTEM WITH VARIABLE RESOLUTION, filed Dec. 1, 1995; or U.S. Pat. No. 5,761,094 entitled VEHICLE COMPASS SYSTEM, filed Jan. 18, 1996, the disclosures of which are incorporated herein by reference.

Figure 8:
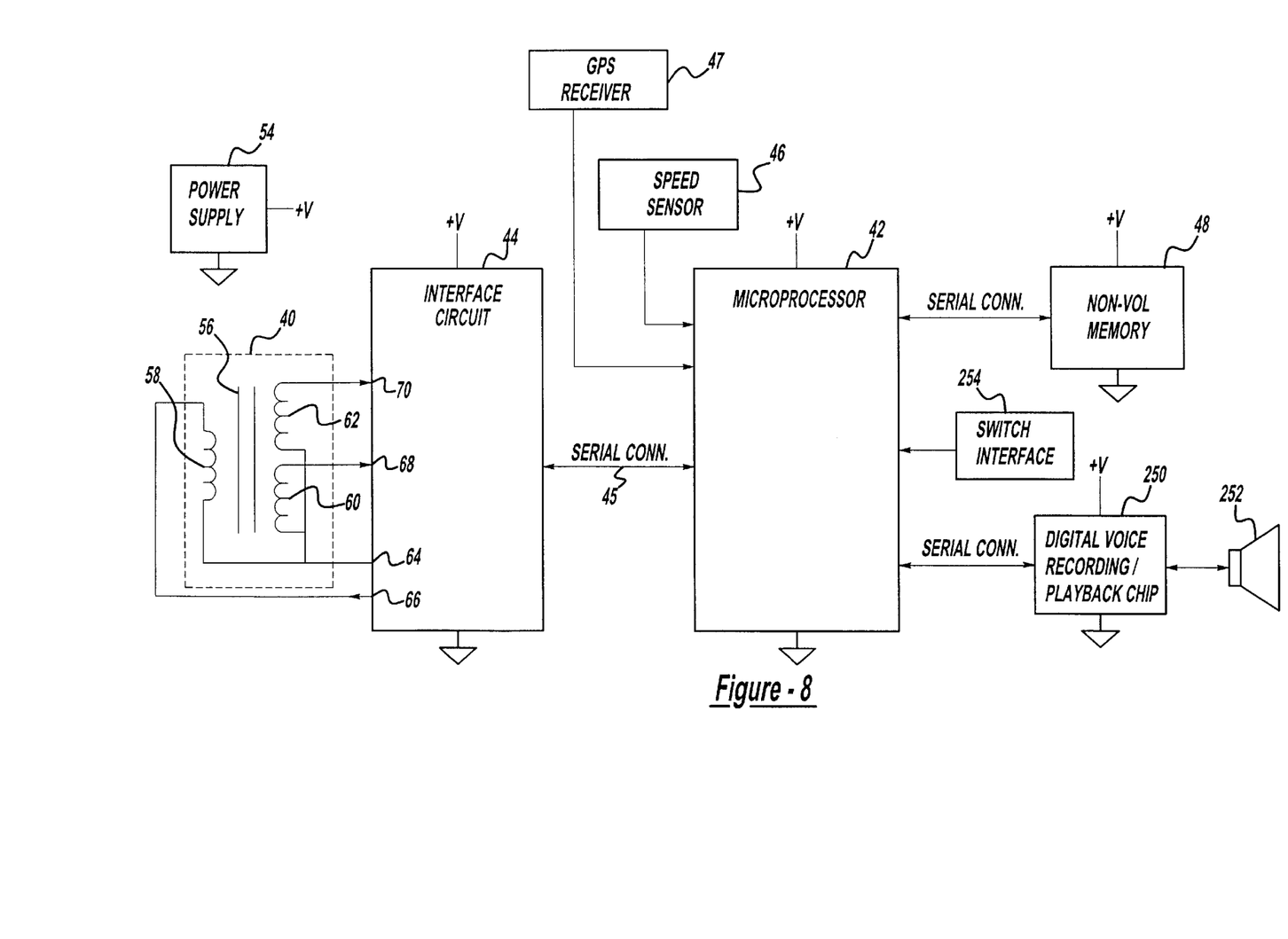
FIG. 8 is an electrical circuit diagram in block and schematic form of a second embodiment of the compass system of the present invention.

Although the above embodiment of the present invention has been described as utilizing a display for displaying the vehicle heading to the vehicle occupants, it will be appreciated by those skilled in the art from the following description of the second embodiment of the present invention, that such a display may be replaced with other forms of structures serving as a heading indicator. For example, in the second embodiment of the present invention, the display and display driver of the first embodiment are replaced with audio messaging means that generates an audible message indicating the vehicle's heading. As shown in FIG. 8, such audio messaging means may be implemented by providing a digital voice recording/playback chip 250 coupled between microprocessor 42 and a combined speaker/microphone 252. Digital voice recording/playback chip 250 may be an ISD 1000 AP chip. Speaker/microphone 252 is provided for receiving voice information to be recorded and for playing back such recorded messages as well as prestored audio messages that correspond to a particular vehicle heading. These prestored audio messages and any other recorded messages may be stored in NVM 48.

The compass system according to the second embodiment of the present invention further includes a switch interface circuit 254 coupled to microprocessor 42 for enabling a user to actuate different switches that may be provided anywhere in the vehicle interior to cause microprocessor 42 to enable digital voice recording/playback chip 250 to record a message for storing in NVM 48, playback one of the recorded messages, or to generate an audible message from the prestored vehicle heading audio messages indicating the current heading of the vehicle. As an alternative to providing such switches, a voice recognition and actuation system such as that disclosed in U.S. Pat. No. 4,827,520 may be employed such that a user need only state a command such as "compass" which the system will recognize and playback a message indicating the vehicle's current heading. Similarly, a voice command such as "record" or "playback" would cause microprocessor 42 to begin recording a message or to playback a recorded message.

By informing a vehicle operator of the vehicle heading using an audible message, the need for providing an expensive display is eliminated thereby reducing the cost of including a compass system in a vehicle and also providing for increased flexibility in incorporating such a system in a vehicle. Additionally, as apparent from the above description, the compass system may be programmed to perform additional functions such as recording memos for subsequent playback.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. An electronic compass system for a vehicle comprising:

a magnetic field sensor for detecting the earth's magnetic field and for providing electrical signals representing the direction of the vehicle in relation to the earth's magnetic field;

a heading indicator for indicating vehicle headings in response to received vehicle heading signals; and a processor coupled to said magnetic field sensor for receiving said electrical signals and coupled to said heading indicator for supplying the vehicle heading signals to said heading indicator, said processor including first compass control means for calculating vehicle headings in response to said received electrical signals using precalibration data to compensate for expected vehicular magnetism, second compass control means for calculating vehicle headings in response to said received electrical signals using an automatic calibration routine to compensate for actual vehicular magnetism, and control transfer means for initially selecting the vehicle headings calculated by said first compass control means to be represented by the vehicle heading signal supplied to said heading indicator, and for selecting the vehicle headings calculated by said second compass control means after the automatic calibration routine has acquired sufficient data from said magnetic field sensor to calibrate the compass system.

2. The compass system as defined in claim 1, wherein said control transfer means selects the vehicle headings calculated by said second compass control means when a vehicle heading calculated by said first compass control means is the same as a vehicle heading calculated by said second compass control means.

3. The compass system as defined in claim 1, wherein the automatic calibration routine is determined to have acquired sufficient data from said magnetic field sensor to calibrate the compass system when data is acquired from the sensor during travel of the vehicle through at least one 360 degree loop.

4. The compass system as defined in claim 1, wherein the automatic calibration routine is determined to have acquired sufficient data from said magnetic field sensor to calibrate the compass system when data is acquired from the sensor during travel of the vehicle through three 360 degree loops.

5. The compass system as defined in claim 1, wherein said heading indicator includes a display for displaying the vehicle's heading in response to the received vehicle heading signals.

6. The compass system as defined in claim 1, wherein said heading indicator includes audio messaging means for selecting for playback one of a plurality of prestored audio messages stating a heading corresponding to the vehicle heading identified in the received vehicle heading signal.

7. The compass system as defined in claim 6, wherein said audio messaging means includes:

memory means for storing a plurality of prestored audio messages each corresponding to a different potential vehicle heading;

message selecting means included in said processor and coupled to said memory means for selecting for playback one of said plurality of prestored audio messages that corresponds to the vehicle heading represented by the vehicle heading signal; and audio output means coupled to said message selecting means for audibly generating the selected prestored audio message.

8. A method for calibrating a vehicle compass system to account for changes in vehicular magnetism, the vehicle compass system having a magnetic field sensor for providing electrical signals representing the earth's magnetic field, a processing circuit for processing said electrical signals to generate vehicle heading signals representing the vehicle's heading, and a heading indicator indicating the vehicle's heading in response to the vehicle heading signals received from the processing circuit, said method comprising the steps of:

(a) calculating a vehicle heading in response to the electrical signals output from the magnetic field sensor using precalibration data to compensate for expected vehicular magnetism;

(b) generating and supplying a vehicle heading signal representing the vehicle heading calculated in step (a) to the heading indicator;

(c) executing an automatic calibration routine to calculate compensation data to correct for actual vehicular magnetism and to calculate a vehicle heading in response to said received electrical signals using the compensation data;

(d) determining whether the automatic calibration routine has acquired sufficient data from said magnetic field sensor to calibrate the compass system;

(e) repeating steps (a) through (d) until it has been determined in step (d) that the automatic calibration routine has acquired sufficient data; and (f) generating and supplying vehicle heading signals to the heading indicator representing vehicle headings calculated in response to said received electrical signals using the compensation data generated by the automatic calibration routine.

9. The method as defined in claim 8, wherein the automatic calibration routine is determined to have acquired sufficient data from the magnetic field sensor to calibrate the compass system in step (d) when data is acquired from the sensor during travel of the vehicle through at least one 360 degree loop.

10. The method as defined in claim 8, wherein the automatic calibration routine is determined to have acquired sufficient data from said magnetic field sensor to calibrate the compass system in step (d) when data is acquired from the sensor during travel of the vehicle through three 360 degree loops.

11. A method for calibrating a vehicle compass system to account for changes in vehicular magnetism, the vehicle compass system having a magnetic field sensor for providing electrical signals representing the earth's magnetic field, a processing circuit for processing said electrical signals to generate vehicle heading signals representing the vehicle's heading, and a heading indicator indicating the vehicle's heading in response to the vehicle heading signals received from the processing circuit, said method comprising the steps of:

(a) calculating a vehicle heading in response to the electrical signals output from the magnetic field sensor using precalibration data to compensate for expected vehicular magnetism;

(b) generating and supplying a vehicle heading signal representing the vehicle heading calculated in step (a) to the heading indictor;

(c) executing an automatic calibration routine to calculate compensation data to correct for actual vehicular magnetism and to calculate a vehicle heading in response to said received electrical signals using the compensation data;

(d) determining whether the automatic calibration routine has acquired sufficient data from said magnetic field sensor to calibrate the compass system;

(e) determining whether the vehicle heading calculated in step (a) is the same as the vehicle heading calculated in step (c);

(f) repeating steps (a) through (e) until (1) it has been determined in step (d) that the automatic calibration routine has acquired sufficient data and (2) it has been determined in step (e) that the vehicle heading calculated in step (a) is the same as the vehicle heading calculated in step (c); and (g) generating and supplying vehicle heading signals to the heading indicator representing vehicle headings calculated in response to said received electrical signals using the compensation data generated by the automatic calibration routine.

12. An electronic compass system for a vehicle comprising:
   a magnetic field sensor for detecting the earth's magnetic field and for providing electrical signals representing the direction of the vehicle in relation to the earth's magnetic field;
   a heading indicator for indicating vehicle headings in response to received vehicle heading signals; and
   a processor coupled to said magnetic field sensor for receiving said electrical signals and coupled to said heading indicator for supplying the vehicle heading signals to said heading indicator, said processor including
      first compass control means for calculating vehicle headings in response to said received electrical signals using precalibration data to compensate for expected vehicular magnetism,
      second compass control means for calculating vehicle headings in response to said received electrical signals using an automatic calibration routine to compensate for actual vehicular magnetism, and
      control transfer means for initially selecting the vehicle headings calculated by said first compass control means to be represented by the vehicle heading signals supplied to said heading indicator, and for selecting the vehicle headings calculated by said second compass control means when a vehicle heading calculated by said first compass control means is the same as a vehicle heading calculated by said second compass control means.

13. An electronic compass system for a vehicle comprising:
   a magnetic field sensor for detecting the earth's magnetic field and for providing electrical signals representing the direction of the vehicle in relation to the earth's magnetic field;
   a memory for storing a plurality of prestored audio messages each corresponding to a different vehicle heading;
   a processor coupled to said magnetic field sensor for receiving said electrical signals and calculating a vehicle heading in response to said electrical signals, said processor further being coupled to said memory for selecting for playback one of said plurality of prestored audio messages that corresponds to the calculated vehicle heading;
      a first compass control means for calculating vehicle headings in response to said electrical signals using precalibration data to compensate for expected vehicular magnetism,
      a second compass control means for calculating vehicle headings in response to said electrical signals using an automatic calibration routine to compensate for actual vehicular magnetism; and
      a control transfer means for initially selecting the vehicle headings calculated by said first compass control means to be represented by the vehicle heading signal supplied to said heading indicator, and for selecting the vehicle headings calculated by said second compass control means after the automatic calibration routine has acquired sufficient data from said magnetic field sensor to calibrate the compass system; and
   an audio transducer coupled to said processor and said memory means for audibly generating the selected prestored audio message.

14. The compass system as defined in claim 13, wherein said transducer is a speaker.

15. The compass system as defined in claim 13, wherein said audio messages include "north," "south," "east," and "west."

16. The compass system as defined in claim 15, wherein said audio messages include "Northeast," "Southeast," "Southwest," and "Northwest."

17. The compass system as defined in claim 13, wherein said processor further includes:
   first compass control means for calculating vehicle headings in response to said received electrical signals using precalibration data to compensate for expected vehicular magnetism;
   second compass control means for calculating vehicle headings in response to said received electrical signals using an automatic calibration routine to compensate for actual vehicular magnetism; and
   control transfer means for initially selecting the vehicle headings calculated by said first compass control means for use in selecting for playback one of said prestored audio messages, and for selecting the vehicle headings calculated by said second compass control means when a vehicle heading calculated by said first compass control means is the same as a vehicle heading calculated by said second compass control means.

18. The compass system as defined in claim 13, wherein said processor further includes:
   first compass control means for calculating vehicle headings in response to said received electrical signals using precalibration data to compensate for expected vehicular magnetism;
   second compass control means for calculating vehicle headings in response to said received electrical signals using an automatic calibration routine to compensate for actual vehicular magnetism; and
   control transfer means for initially selecting the vehicle headings calculated by said first compass control means for use in selecting for playback one of said prestored audio messages, and for selecting the vehicle headings calculated by said second compass control means after the automatic calibration routine has acquired sufficient data from said magnetic field sensor to calibrate the compass system.

19. The compass system as defined in claim 13 and further including a user interface coupled to said processor for receiving user commands, and audio input means coupled to said processor for receiving voice information, wherein said processor responds to a record command received from said user interface by enabling said audio input means to digitize received voice information and recording the digitized voice information in said memory.

20. The compass system as defined in claim 19, wherein said processor responds to a playback command received from said user interface by reading recorded voice information from said memory and by enabling said transducer to audible the recorded voice information.

21. The compass system as defined in claim 20, wherein said user interface includes a first user-actuated switch for inputting a record command and a second user-actuated switch for inputting a playback command.

22. The compass system as defined in claim 13 and further including a user interface coupled to said processor for receiving user commands, wherein said processor responds to a user command to output the vehicle heading by selecting and reading from said memory the prestored audio message corresponding to the calculated vehicle heading and by enabling said transducer to audible the selected audio message.

23. The compass system as defined in claim 22, wherein said user interface includes a user-actuated switch for inputting a command to output the vehicle heading.

24. An accessory for a vehicle comprising:

a housing;

an electronic compass field for providing electrical signals representing the direction of the vehicle in relation to the earth's magetic field, provided in said housing for indicating the vehicle's heading;

an audio input means provided in said housing for receiving an audible message;

a memory coupled to said audio input means for storing audio messages;

a transducer provided in said housing and coupled to said memory for audibly generating a selected audio message;

a user interface provided in said housing for receiving user commands; and a processor coupled to said user interface, said transducer, said audio input means, and said memory, wherein said processor responds to a record command received from said user interface by enabling said audio input means to digitize a received audible message and by recording the digitized message in said memory, and said processor responds to a playback command received from said user interface by selecting and reading a recorded audio message from said memory and by enabling said transducer to audiblize the recorded audio message; and a first compass control means for calculating vehicle headings in response to said electrical signals using precalibration data to compensate for expected vehicular magnetism a second compass control means for calculating vehicle headings in response to said electrical signals using an automatic calibration routine to compensate for actual vehicular magnetism; and a control transfer means for initially selecting the vehicle headings calculated by said first compass control means to be represented by the vehicle heading signal supplied to said heading indicator, and for selecting the vehicle headings calculated by said second compass control means after the automatic calibration routine has acquired sufficient data from said magnetic field.

25. The vehicle accessory as defined in claim 24, wherein said electronic compass includes a sensor coupled to said processor for supplying electric signals representing the earth's magnetic field, said processor calculates the vehicle's heading from the electric signals from said sensor.

26. The vehicle accessory as defined in claim 25, wherein a plurality of prestored audio messages are stored in said memory that each correspond to a different vehicle heading, and said processor selects for playback through said transducer a prestored audio message that corresponds to the vehicle's calculated heading.

* * * * *

UNITED STATES PATENT AND TRADEMARK OFFICE
CERTIFICATE OF CORRECTION

PATENT NO. : 6,192,315 B1
DATED : February 20, 2001
INVENTOR(S) : Geschke et al.

It is certified that error appears in the above-identified patent and that said Letters Patent is hereby corrected as shown below:

Column 17,
Lines 10 and 21, replace "audible" with -- audiblize --

Signed and Sealed this

Sixth Day of November, 2001

Attest:

*Nicholas P. Godici*

NICHOLAS P. GODICI
*Attesting Officer*     *Acting Director of the United States Patent and Trademark Office*